(12) United States Patent
Lim et al.

(10) Patent No.: US 9,967,302 B2
(45) Date of Patent: May 8, 2018

(54) METHOD AND SYSTEM FOR COMPLEXITY ADAPTIVE STREAMING

(71) Applicant: Samsung Electronics Co., LTD, Suwon-si, Gyeonggi-do (KR)

(72) Inventors: Youngkwon Lim, Allen, TX (US); Zhan Ma, Dallas, TX (US); Kong Posh Bhat, Plano, TX (US); Felix C. A. Fernandes, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 776 days.

(21) Appl. No.: 14/076,998

(22) Filed: Nov. 11, 2013

(65) Prior Publication Data

US 2014/0136727 A1 May 15, 2014

Related U.S. Application Data

(60) Provisional application No. 61/726,343, filed on Nov. 14, 2012.

(51) Int. Cl.
*H04N 21/2381* (2011.01)
*H04L 29/06* (2006.01)

(52) U.S. Cl.
CPC ........ *H04L 65/4084* (2013.01); *H04L 65/602* (2013.01); *H04L 65/80* (2013.01)

(58) Field of Classification Search
CPC ... H04L 65/4084; H04L 65/80; H04L 65/607; H04L 65/608; H04L 41/5067;
(Continued)

(56) References Cited

U.S. PATENT DOCUMENTS 7,016,547 B1 * 3/2006 Smirnov ........................ 382/245
7,093,001 B2 * 8/2006 Yang et al. .................... 709/219
(Continued)

FOREIGN PATENT DOCUMENTS

WO    WO 2011/047335 A1    4/2011
WO    WO 2011/078721 A1    6/2011

OTHER PUBLICATIONS

International Search Report dated Feb. 19, 2014 in connection with International Application No. PCT/KR2013/010320, 3 pages.
(Continued)

*Primary Examiner* — Sargon Nano

(57) ABSTRACT

A method includes calculating a complexity value for each segment or version of multimedia content. The multimedia content has multiple versions associated with common content and different encoding parameters, and each version is divided into segments. The method also includes adaptively streaming the multimedia content to a client device based on at least some of the calculated complexity values. The complexity value for each segment or version is calculated by summing multiple operation complexity values defining complexities of operations for decoding the segment or version. The operation complexity values could include values for a bit parsing operation, a buffer initialization operation, an intra-prediction operation, an inverse quantization and transform operation, a reference block fetch operation, a fractional interpolation operation, and in-loop deblocking operation, a sample adaptive offset correction operation, an adaptive loop filtering operation, and a de-ringing filtering operation.

18 Claims, 5 Drawing Sheets

(58) Field of Classification Search
CPC ............ H04L 67/1025; H04L 43/0882; H04L 47/2408; H04N 21/6125; H04N 21/44209; H04N 21/2408; H04N 21/4126; H04N 19/40; H04N 21/02; H04N 21/24

See application file for complete search history.

(56) References Cited

U.S. PATENT DOCUMENTS

| | | | |
|---|---|---|---|
| 7,636,768 B2* | 12/2009 | Yang et al. | 709/219 |
| 7,747,701 B2* | 6/2010 | Yang et al. | 709/219 |
| 7,836,152 B2* | 11/2010 | Yang et al. | 709/219 |
| 8,270,473 B2* | 9/2012 | Chen et al. | 375/240.03 |
| 8,910,229 B2* | 12/2014 | Xu et al. | 725/116 |
| 9,723,046 B2* | 8/2017 | Appleby | H04L 65/607 |
| 2002/0007273 A1 | 1/2002 | Chen | |
| 2005/0154788 A1* | 7/2005 | Yang et al. | 709/219 |
| 2006/0129671 A1* | 6/2006 | Yang et al. | 709/223 |
| 2008/0165861 A1 | 7/2008 | Wen et al. | |
| 2011/0060792 A1 | 3/2011 | Ebersviller | |
| 2012/0250757 A1 | 10/2012 | Mabey et al. | |
| 2013/0042015 A1* | 2/2013 | Begen et al. | 709/231 |
| 2013/0179588 A1* | 7/2013 | McCarthy et al. | 709/231 |
| 2013/0179589 A1* | 7/2013 | McCarthy et al. | 709/231 |
| 2013/0179590 A1* | 7/2013 | McCarthy et al. | 709/231 |
| 2014/0379871 A1* | 12/2014 | Van Brandenburg et al. | 709/219 |
| 2015/0082345 A1* | 3/2015 | Archer et al. | 725/34 |

OTHER PUBLICATIONS

Written Opinion of the International Searching Authority dated Feb. 19, 2014 in connection with International Application No. PCT/KR2013/010320, 4 pages.

Ma, et al.; "Embedding Content Information in Video Streams for Energy-efficient Video Processing on Mobile Devices"; International Organisation for Standardisation; ISO/IEC JTC1/SC29/WG11; Jul. 2012; Stockholm, Sweden; 4 pages.

"Information Technology—Dynamic adaptive streaming over HTTP (DASH)—Part 1: Media presentation description and segment formats"; International Standard; ISO/IEC 23009-1 First edition Apr. 1, 2012; 128 pages.

* cited by examiner

METHOD AND SYSTEM FOR COMPLEXITY ADAPTIVE STREAMING

CROSS-REFERENCE TO RELATED APPLICATION AND PRIORITY CLAIM

This application claims priority under 35 U.S.C. § 119(e) to U.S. Provisional Patent Application No. 61/726,343 filed on Nov. 14, 2012. This provisional patent application is hereby incorporated by reference in its entirety.

TECHNICAL FIELD

This disclosure relates generally to network streaming of multimedia content. More specifically, this disclosure relates to a method and system for complexity adaptive streaming.

BACKGROUND

Many devices are able to receive multimedia content over a network and provide the multimedia content to users of the devices. For example, smartphones, tablet computers, portable computers, and other client devices can receive multimedia content over wireless networks and present the multimedia content to users. In this document, "multimedia content" includes audio-only content, video-only content, and audio and video content.

State-of-the-art video streaming over hypertext transfer protocol (HTTP) technology enables dynamic adaptive delivery of multimedia content. This technology allows different client devices to receive different versions of the same multimedia content. A server can provide a list of available versions of multimedia content to the client devices, and each client device can select one of the versions for retrieval and presentation.

Generally, each version of the same multimedia content provided by a server has a different configuration of encoding parameters, resulting in different bitrates. Example encoding parameters can include compression ratios for audio or video content, spatial resolutions for multimedia content, and temporal resolutions for multimedia content. The list of versions can also include various audio versions and texts associated with different languages. Each client device typically selects one or more of the available versions according to the client device's capabilities and network conditions. During delivery, a client device can also seamlessly change from one version to another version, such as when the client device detects a change in network conditions.

SUMMARY

This disclosure provides a method and system for complexity adaptive streaming.

In a first embodiment, a method includes calculating a complexity value for each segment or version of multimedia content. The multimedia content has multiple versions associated with common content and different encoding parameters, and each version is divided into segments. The method also includes adaptively streaming the multimedia content to a client device based on at least some of the calculated complexity values. The complexity value for each segment or version is calculated by summing multiple operation complexity values defining complexities of operations for decoding the segment or version.

In a second embodiment, an apparatus includes at least one network interface configured to communicate with a client device over a network. The apparatus also includes at least one processing device configured to calculate a complexity value for each segment or version of multimedia content. The multimedia content has multiple versions associated with common content and different encoding parameters, and each version is divided into segments. The at least one processing device is also configured to adaptively stream the multimedia content via the at least one network interface to the client device based on at least some of the calculated complexity values. The at least one processing device is configured to calculate the complexity value for each segment or version by summing multiple operation complexity values defining complexities of operations for decoding the segment or version.

In a third embodiment, a method includes receiving a list of available versions of multimedia content at a client device. The multimedia content has multiple versions associated with common content and different encoding parameters, and each version is divided into segments. The method also includes identifying whether the client device has a specified power status. The method further includes, when the client device has the specified power status, selecting or switching to a segment or version that consumes less power for decoding. In addition, the method includes receiving and rendering the segment or version of multimedia content. The selecting or switching includes selecting or switching to a segment or version having a lower complexity value, where the complexity value represents a sum of multiple operation complexity values defining complexities of operations for decoding the segment or version.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
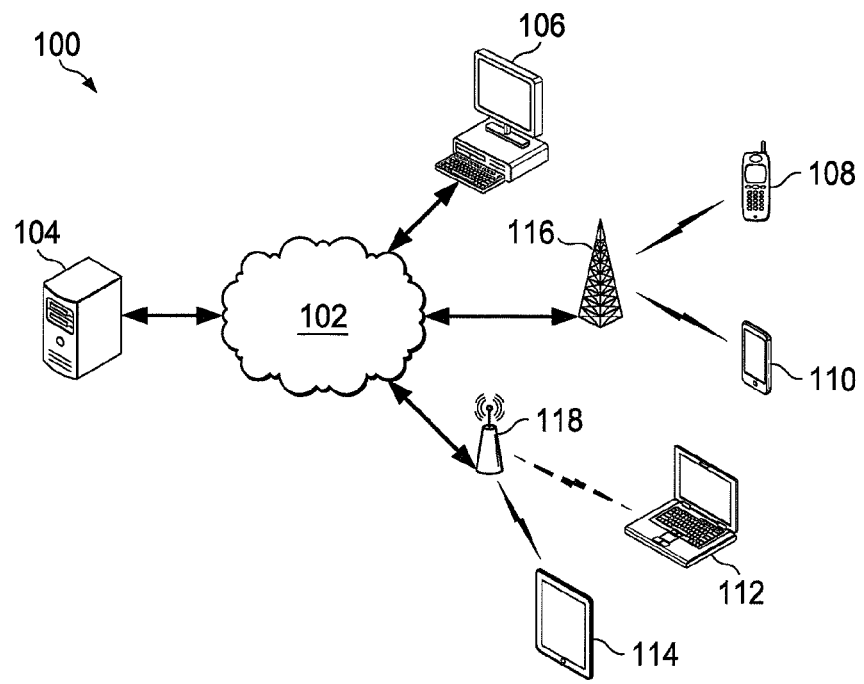
FIG. 1 illustrates an example system supporting complexity adaptive streaming according to this disclosure.

FIG. 1 illustrates an example system 100 supporting complexity adaptive streaming according to this disclosure. As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations. The network 102 transports multimedia content between at least one server 104 and various client devices 106-114. The client devices 106-114 receive the multimedia content from the server 104 and decode and render the multimedia content for presentation to users.

Each server 104 includes any suitable computing or processing device that provides multimedia content to one or more client devices. Each server 104 could, for example, include one or more processing devices, one or more memories storing instructions and data, and one or more network interfaces facilitating communication over the network 102.

Each client device 106-114 represents any suitable computing or processing device that receives, decodes, and renders multimedia content. In this example, the client devices 106-114 include a desktop computer 106, a mobile telephone or smartphone 108, a personal digital assistant (PDA) 110, a laptop computer 112, and a tablet computer 114. However, any other or additional client devices could be used to obtain multimedia content from a server for decoding, rendering, and presentation.

In this example, some client devices 108-114 communicate indirectly with the network 102. For example, the client devices 108-110 communicate via one or more base stations 116, such as cellular base stations. Also, the client devices 112-114 communicate via one or more wireless access points 118, such as 802.11 access points. Note that these are for illustration only and that each client device could communicate directly or indirectly with the network 102.

As described in more detail below, the system 100 supports adaptive streaming based on the complexity of the multimedia content sent to a client device and the power status of the client device. For example, when a client device has an adequate amount of power in an internal power supply, the client device could request and the server 104 could provide multimedia content having a higher complexity. When the client device enters a power-saving mode or has a power supply level that drops below a specified threshold, the client device could request and the server 104 could provide multimedia content having a lower complexity. Note that the phrase "power status" refers to any indication of the status of a device's power supply, including a measurement of the power supply's output, a mode of operation based on the power supply (such as a power-saving mode), or a status of a device based on the power supply (such as a low power supply state).

In this way, multimedia content can be adaptively streamed to a client device based on the amount of power available to the client device. Multimedia content with higher complexity can require more computations in order to decode, render, and present the multimedia content to a user. As a result, this approach allows a client device in a power-saving mode or in a low battery status to select or switch to a less complex version of multimedia content. The less complex version may require less power for decoding and rendering, and the less complex version can be requested and obtained without discontinuing use of a streaming service. This solution may benefit mobile devices operated with batteries, such as smartphones, tablets, multimedia players, and notebook computers. However, this approach could also be used with other types of client devices.

To support this approach, the server 104 can calculate the complexities of the segments of multimedia content. As noted above, each version of multimedia content can have different encoding parameters, such as different compression ratios, spatial resolutions, and/or temporal resolutions. Also, different versions can be associated with different languages. As a result, segments associated with different versions of the same multimedia content may require different numbers of computations to decode and render the content. The server 104 supports a novel technique for computing the complexity of each segment, and the complexity of each segment can be used as a measure of the power consumption needed to decode and render that segment. The calculated complexities can therefore be used to enable dynamic adaptive streaming according to each client device's power status.

In some embodiments, the server 104 supports Dynamic Adaptive Streaming over HTTP (DASH) technology, where the server 104 provides a list of available versions of multimedia content in the form of a Media Presentation Description (MPD). The MPD can identify multiple versions of the same multimedia content with different coding parameters, where each version is referred to as a Representation. Each Representation is fragmented into smaller pieces of bitstream known as Segments. When a client device is receiving a stream of the multimedia content, the client device may analyze the status of the client device and the network conditions at each Segment boundary. The client device may then select the next Segment from among the available Representations for seamless consumption of the content while maintaining the quality of the content as high as possible. For example, if a buffer in the client device is filled above an expected level, the client device can select its next Segment from a Representation with a lower bitrate than the Representation to which the current Segment belongs.

Additional details regarding the adaptive streaming approach are provided below. Example embodiments of a client device and a server supporting the adaptive streaming approach are also described below.

Although FIG. 1 illustrates one example of a system 100 supporting complexity adaptive streaming, various changes may be made to FIG. 1. For example, the system 100 could include any number of each component in any suitable arrangement. Computing and communication networks come in a wide variety of configurations, and FIG. 1 does not limit the scope of this disclosure to any particular configuration. While FIG. 1 illustrates one operational environment in which adaptive streaming can be used, this functionality could be used in any other suitable system.

Figure 3:
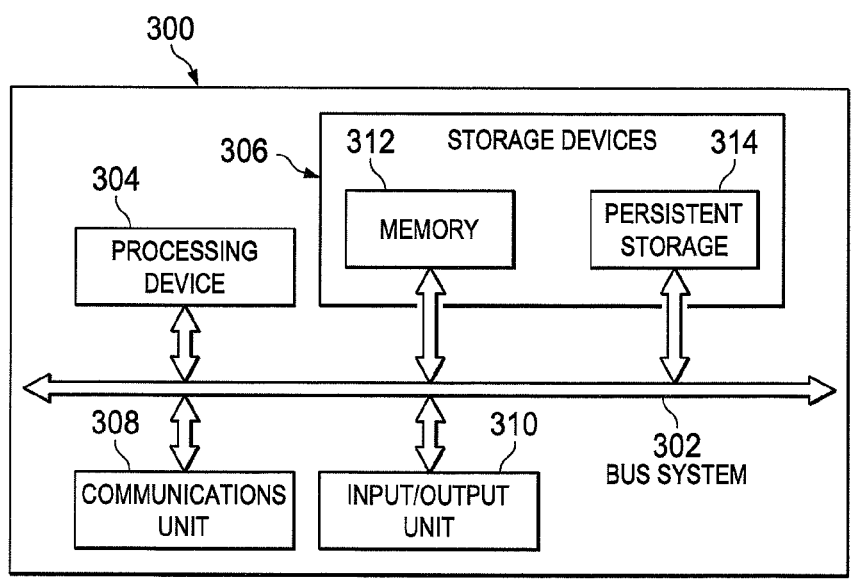
FIGS. 2 through 4 illustrate example devices supporting complexity adaptive streaming and related details according to this disclosure.
Figure 2:
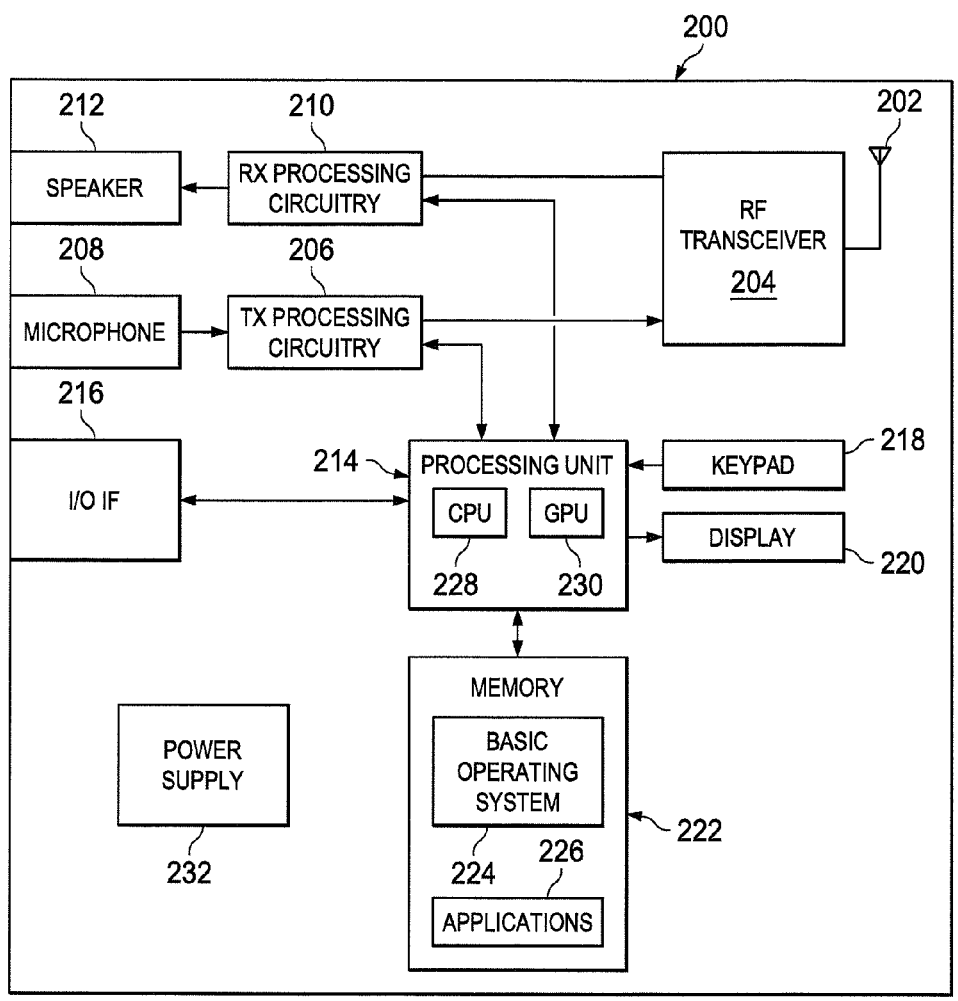
Figure 4:
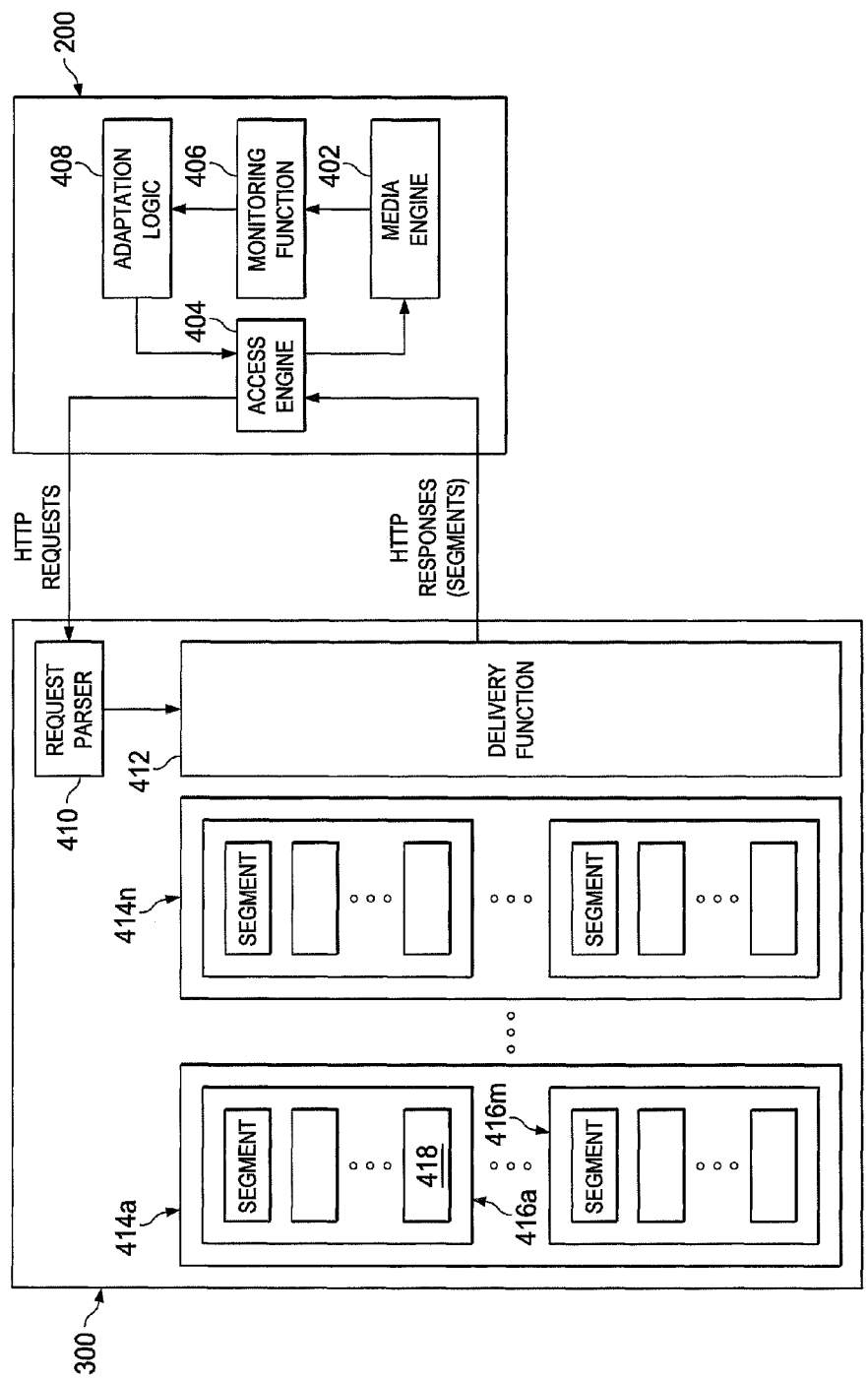

FIGS. 2 through 4 illustrate example devices supporting complexity adaptive streaming and related details according to this disclosure. In particular, FIG. 2 illustrates an example client device 200, FIG. 3 illustrates an example server 300, and FIG. 4 illustrates example functional components of the server 300 and the client device 200. The client device 200 could represent one or more of the client devices 106-114 in FIG. 1, and the server 300 could represent the server 104 in FIG. 1.

As shown in FIG. 2, the client device 200 includes an antenna 202, a radio frequency (RF) transceiver 204, transmit (TX) processing circuitry 206, a microphone 208, receive (RX) processing circuitry 210, and a speaker 212. The client device 200 also includes a processing unit 214, an input/output (I/O) interface (IF) 216, a keypad 218, a display 220, and a memory 222. The client device 200 could include any number of each of these components.

The processing unit 214 includes processing circuitry configured to execute instructions, such as instructions stored in the memory 222 or within the processing unit 214. The memory 222 includes a basic operating system (OS) program 224 and one or more applications 226. The client device 200 could represent any suitable device that receives and renders multimedia content. In particular embodiments, the client device 200 represents a mobile telephone, smartphone, personal digital assistant, or tablet.

The RF transceiver 204 receives, from the antenna 202, an incoming RF signal transmitted by a base station or other device in a wireless network. The RF transceiver 204 down-converts the incoming RF signal to produce an intermediate frequency (IF) or baseband signal. The IF or baseband signal is sent to the RX processing circuitry 210, which produces a processed baseband signal (such as by filtering, decoding, and/or digitizing the baseband or IF signal). The RX processing circuitry 210 can provide the processed baseband signal to the speaker 212 (for voice data) or to the processing unit 214 for further processing (such as for web browsing or other data).

The TX processing circuitry 206 receives analog or digital voice data from the microphone 208 or other outgoing baseband data (such as web data, e-mail, or interactive video game data) from the processing unit 214. The TX processing circuitry 206 encodes, multiplexes, and/or digitizes the outgoing baseband data to produce a processed baseband or IF signal. The RF transceiver 204 receives the outgoing processed baseband or IF signal from the TX processing circuitry 206 and up-converts the baseband or IF signal to an RF signal that is transmitted via the antenna 202.

In some embodiments, the processing unit 214 includes a central processing unit (CPU) 228 and a graphics processing unit (GPU) 230 embodied in one or more discrete devices. In some embodiments, the CPU 228 and the GPU 230 are implemented as one or more integrated circuits disposed on one or more printed circuit boards.

The memory 222 is coupled to the processing unit 214. In some embodiments, part of the memory 222 represents a random access memory (RAM), and another part of the memory 222 represents a Flash memory acting as a read-only memory (ROM). In some embodiments, the memory 222 is a computer readable medium that stores program instructions for requesting multimedia segments based on a power status of the client device 200. When these program instructions are executed by the processing unit 214, the program instructions cause the client device 200 to monitor its power status, identify when a specified power status is entered, and adjust the requested multimedia segments accordingly.

The processing unit 214 executes the basic OS program 224 stored in the memory 222 in order to control the overall operation of the client device 200. For example, the processing unit 214 can control the RF transceiver 204, RX processing circuitry 210, and TX processing circuitry 206 in accordance with well-known principles to control the reception of forward channel signals and the transmission of reverse channel signals. The processing unit 214 is also capable of executing other processes and programs resident in the memory 222, such as operations for identifying its power status. The processing unit 214 can also move data into or out of the memory 222 as required by an executing process.

The processing unit 214 is coupled to the I/O interface 216, which provides the client device 200 with the ability to connect to other devices. The I/O interface 216 represents a communication path between accessories or other devices and the processing unit 214.

The processing unit 214 is also optionally coupled to the keypad 218 and the display unit 220. An operator of the client device 200 can use the keypad 218 to enter data into the client device 200. The display 220 may be a liquid crystal display, light emitting diode (LED) display, or other display capable of rendering multimedia content, such as from web sites. Alternate embodiments may use other types of input/output devices and displays, such as when a touchscreen that incorporates a display and buttons presented on the display is used.

A power supply 232 provides operating power to the various components of the client device 200. For example, the power supply 232 could provide power to enable the transmission and reception of data and the receipt, decoding, rendering, and presentation of multimedia segments. The power supply 232 represents any suitable source of operating power, such as at least one battery. An AC power adapter could be used to enable operations with an AC power source or to recharge the battery.

As shown in FIG. 3, the server 300 includes a bus system 302, which supports communication between at least one processing device 304, at least one storage device 306, at least one communications unit 308, and at least one I/O unit 310.

The processing device 304 executes instructions that may be loaded into a memory 312. The processing device 304 may include any suitable number(s) and type(s) of processors or other devices in any suitable arrangement. Example types of processing devices 304 include microprocessors, microcontrollers, digital signal processors, field programmable gate arrays, application specific integrated circuits, and discreet circuitry. The memory 312 and a persistent storage 314 are examples of storage devices 306, which represent any structure(s) capable of storing and facilitating retrieval of information (such as data, program code, and/or other suitable information on a temporary or permanent basis). The memory 312 may represent a random access memory or any other suitable volatile or non-volatile storage device(s). The persistent storage 314 may contain one or more components or devices supporting longer-term storage of data, such as a ready only memory, hard drive, flash memory, or optical disc.

The communications unit 308 supports communications with other systems or devices. For example, the communications unit 308 could include a network interface card or a wireless transceiver facilitating communications over the network 102. The communications unit 308 may support communications through any suitable physical or wireless communication link(s).

The input/output unit 310 allows for input and output of data. For example, the input/output unit 310 may provide a connection for user input through a keyboard, mouse, keypad, touchscreen, or other suitable input device. The input/output unit 310 may also send output to a display, printer, or other suitable output device.

Note that while FIG. 3 is described as representing the server 104 of FIG. 1, the same or similar structure could be used in one or more of the client devices 106-114. For example, a laptop or desktop computer could have the same or similar structure as that shown in FIG. 3. As with computing and communication networks, client devices and servers can come in a wide variety of configurations, and FIGS. 2 and 3 do not limit this disclosure to any particular client device or server.

As shown in FIG. 4, the client device 200 includes a media engine 402, which receives segments of multimedia content from the server 300 and processes the segments for presentation. An access engine 404 transmits requests for segments to the server 300 and receives the segments from the server 300. The access engine 404 provides the segments to the media engine 402 for processing. A monitoring function 406 in the client device 200 monitors various conditions, such as the power status of the client device 200 and the condition of a network over which the segments are received. Data from the monitoring function 406 is processed by adaptation logic 408, which uses the data to determine whether to adjust the segments requested from the server 300. For instance, the adaptation logic 408 could determine if the client device 200 has a specified power status, such as whether the client device 200 is in a low-battery state or whether the output of the power supply 232 is less than a threshold. If so, the adaptation logic 408 causes the access engine 404 to request less complex segments from the server 300.

Each of these components 402-408 could be implemented in any suitable manner. For example, each of these components 402-408 could be implemented using hardware components or a combination of hardware and software/firmware instructions. As a particular example, the components 402-408 could be implemented as software/firmware routines executed by the processing unit 214 of the client device 200.

In the server 300, a request parser 410 receives requests from the client device 200 and parses the requests. For example, the request parser 410 can distinguish requests for multimedia content from other types of requests. Requests for multimedia content can be routed to a delivery function 412, which retrieves the appropriate segments (such as from the memory 312 or persistent storage 314) and provides the segments to the client device 200.

In this example, the server 300 includes or has access to multiple multimedia contents 414a-414n. Each multimedia content 414a-414n has different versions 416a-416m (such as different Representations), where the different versions 416a-416m are associated with different encoding parameters, bitrates, or other features (and therefore different complexities). Each version 416a-416m is divided into segments 418 of multimedia content. The multimedia contents 414a-414n can be stored in the memory 312 or persistent storage 314 and made available to the client device 200 in response to the requests.

Note that, in this example, HTTP is used to send requests to the server 300 and to provide responses (segments) to the client device 200. This is for illustration only. Various other protocols could be used to send and receive information over a network.

In some embodiments, the server 300 includes functionality for calculating the complexities of the segments 418 in different versions 416a-416m of the multimedia contents 414a-414n. The complexity of a segment provides an indication of the estimated power consumption needed to decode and render that segment. The server 300 uses the complexities of the segments 418 to serve segments 418 that require lower power consumption to the client device 200 when needed, such as when the client device 200 enters a specified power status. As noted above, the client device 200 includes functionality within its segment selection process to consider the power status of the client device and request lower-complexity segments when needed.

There are various ways to identify the complexity or the estimated power consumption for decoding a segment 418 of multimedia content. For example, the power consumption of a decoding process can be estimated by calculating the number of major decoding process steps, such as motion compensation, deblocking filtering, and parsing of variable length codes. The estimated power consumption of the decoding process can therefore be based on the number of each decoding process operation required to decode a segment (or to decode an entire Representation). Moreover, it is possible to enhance the Media Presentation Description (MPD) provided to a client device 200 by the server 300 so that the MPD represents or identifies the complexities of the segments 418. The complexities can then be translated to power consumption for a typical client device implementing the decoding process.

In some embodiments, bitstream decoding typically involves operations such as bit parsing, buffer initialization, intra-prediction (if applicable), inverse quantization and transform, reference block fetching, fractional reference block interpolation (if applicable), in-loop deblocking (if applicable), sample adaptive offset correction (if applicable), adaptive loop filtering (if applicable), and de-ringing filtering (if applicable). In these embodiments, the total complexity $C_{total}$ for a segment or version can be generally represented as follows:

$$C_{total} = C_{bit\_parsing} + C_{buf\_init} + C_{intra} + C_{itrans} + C_{ref\_fetch} + C_{intp} + C_{dblk} + C_{sao} + C_{alf} + C_{drf} \quad (1)$$

where each of the ten $C_x$ values denotes the complexity of performing the x decoding operation. The $C_x$ values can therefore be referred to as operation complexity values.

In some embodiments, for each decoding operation x, its complexity $C_x$ is proportional to the number of its unit operation (OP). More specifically, the complexity of the bit parsing operation is a linear function of the number of bits, which is denoted $n_{bit}$. The complexity of the buffer initialization operation is linearly related to the block numbers (such as 4×4 or 8×8), which is denoted $n_{total}$. The complexity of the intra-prediction operation is linearly related to the intra-block number, which is denoted $n_{intra}$. The transform complexity is proportional to the number of non-zero blocks, which is expressed as $n_{total}-n_{zero}$. The reference block fetch's complexity is proportional to the image size or the total block number, which is denoted $n_{total}$. The complexity of the interpolation operation is linearly related to the number of interpolations required, which is denoted $n_{intp}$. The complexities of the deblocking operation and the sample adaptive offset correction operation depend on the number of pixels that require deblocking and offset correction, which are denoted $n_{dblk}$ and $n_{sao}$. The adaptive loop filter and de-ringing filter complexities are proportional to the number of the blocks that require the filtering, which are denoted $n_{alf}$ and $n_{drf}$.

With this in mind, the various G values in Equation (1) can be expressed as follows:

$$C_{bit\_parsing} = k_{bit} \times n_{bit} \quad (2)$$

$$C_{buf\_init} = k_{buf\_init} \times n_{total} \quad (3)$$

$$C_{intra} = k_{intra} \times n_{intra} \quad (4)$$

$$C_{itrans} = k_{itrans} \times (n_{total} - n_{zero}) \quad (5)$$

$$C_{ref\_fetch} = k_{ref\_fetch} \times n_{total} \quad (6)$$

$$C_{intp} = k_{intp} \times n_{intp} \quad (7)$$

$$C_{dblk} = k_{dblk} \times n_{dblk} \quad (8)$$

$$C_{sao} = k_{sao} \times n_{sao} \quad (9)$$

$$C_{alf} = k_{alf} \times n_{alf} \quad (10)$$

$$C_{drf} = k_{drf} \times n_{drf} \quad (11)$$

Here, values for $n_{zero}$, $n_{intra}$, $n_{dblk}$, $n_{sao}$, $n_{alf}$ and $n_{drf}$ can be derived from the encoding process for a segment or version and used to compute the various complexity metrics for the segment or version. Also, the value of $n_{bit}$ is known from the length of the bitstream segment or version, which can be easily obtained. Further, the value of $n_{total}$ can be derived using the image resolution and basic block size used in various standards. In addition, the values $k_{bit}$, $k_{buf\_init}$, $k_{intra}$, $k_{itrans}$, $k_{ref\_fetch}$, $k_{intp}$, $k_{dblk}$, $k_{sao}$, $k_{alf}$, and $k_{drf}$ denote various unit operation complexity values.

To enable accurate segment or version complexity computations, the unit operation complexity values can be initially assigned default values and then refined, such as by decoding several sample streams or by using historical data for the same implementation/standard. The unit operation complexity values could be different for different implementations/standards and could be zero if the corresponding value is not supported by a certain implementation/standard. As particular examples, $k_{sao}$, $k_{alf}$, and $k_{drf}$ can be zero for the H.264/AVC standards. Table 1 illustrates how different standards are associated with different complexity values. Complexity values for blank table entries can be set to zero.

TABLE 1

| Operation | MPEG-2 | H.264/AVC | HEVC | HEVC Extensions |
|---|---|---|---|---|
| Bit Parsing | x | x | x | x |
| Buffer Initialization | x | x | x | x |
| De-Quantization & Transform | x | x | x | x |
| Intra Prediction |  | x | x | x |
| Reference Block Fetch | x | x | x | x |
| Fractional Interpolation |  | x | x | x |
| In-Loop Deblocking |  | x | x | x |
| Sample Adaptive Offset |  |  | x | x |
| Adaptive Loop Filtering |  |  |  | x |
| De-Ringing Filtering |  |  |  | x |

The server 300 can calculate the total complexity values $C_{total}$ for various segments 418 or versions and use these complexity values $C_{total}$ to serve appropriate segments or versions to the client device 200. For example, the server 300 could initially provide the client device 200 with segments 418 having a first total complexity value. If the client device 200 detects improved network conditions, the server 300 could then provide the client device 200 with segments 418 having higher total complexity values (even segments for the same multimedia content Representation). If the client device 200 detects degraded network conditions or if the client device 200 detects that it has a specified power status, the server 300 could provide the client device 200 with segments 418 having lower total complexity values.

In this way, the delivery of content to the client device 200 can be optimized based on (among other things) the power status of the client device 200. Streaming of content to mobile devices is becoming more and more popular, and streaming over HTTP technology is widely accepted these days. The approach described here can be used in some embodiments to improve the widely-used streaming over HTTP technology. Since video streaming generally consumes much more power than other operations, video streaming functionality is normally blocked when a mobile device has a low battery status or is in a power-saving mode. If the mobile device enters this status or more while a user is watching video content, this can disrupt the user's activities and annoy the user. Embodiments of this disclosure allow the mobile device to continue playback of video content until the end of the video content without ceasing playback of the content. This can help to avoid disappointing the user.

Although FIGS. 2 through 4 illustrate examples of devices supporting complexity adaptive streaming and related details, various changes may be made to FIGS. 2 through 4. For example, as noted above, other devices could be used to serve content adaptively or to request and receive content adaptively.

Figure 5:
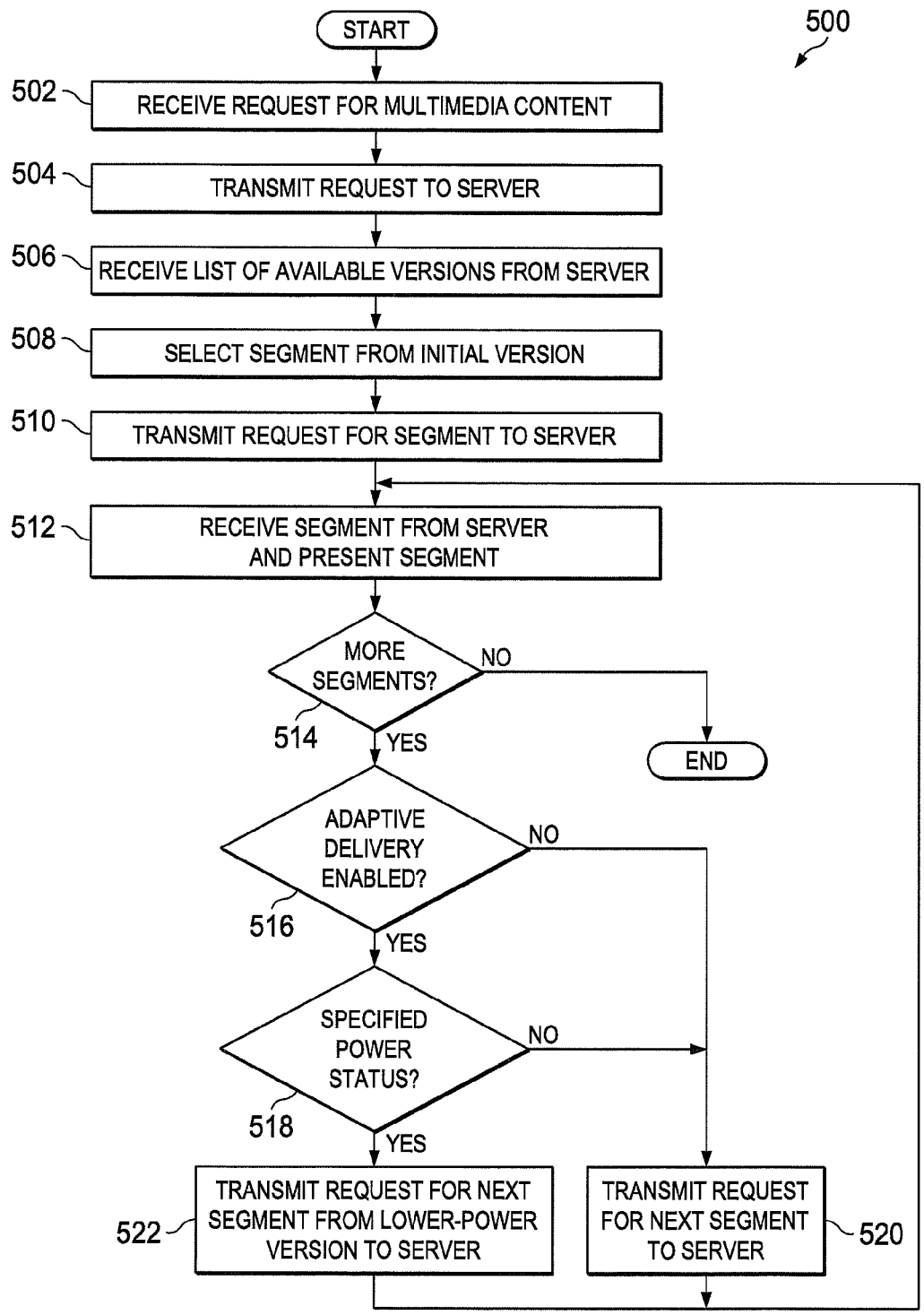
FIG. 5 illustrates an example method for complexity adaptive streaming according to this disclosure.

FIG. 5 illustrates an example method 500 for complexity adaptive streaming according to this disclosure. For ease of explanation, the method 500 is described with respect to the client device 200 operating in conjunction with the server 300 in the system 100. However, the method 500 could be used with any other suitable device(s) and in any other suitable system.

As shown in FIG. 5, a request for multimedia content is received by a client device at step 502. This could include, for example, the client device 200 receiving a request for multimedia content from a user. The request could be associated with a website, a streaming content service, or any other suitable source.

A request for content is transmitted to a server at step 504. This could include, for example, the client device 200 transmitting a request for the multimedia content to the server 300. The client device receives a list of available versions of the requested content at step 506. This could include, for example, the client device 200 receiving an MPD from the server 300. The MPD can identify all versions 416a-416m of the selected multimedia content or a subset of the versions.

A version of the content is selected at step 508, and a request for the selected version is transmitted to the server at step 510. This could include, for example, the client device 200 selecting one of the available versions based on current network conditions or the client device's characteristic(s). The client device receives a segment from the server and presents the segment at step 512. This could include, for example, the client device 200 decoding and rendering video content for display or decoding and rendering audio content for playback.

A determination is made whether to request additional segments at step 514. If not, the process can end. Otherwise, the client device determines whether adaptive delivery is enabled at step 516. This could include, for example, the client device 200 determining whether Dynamic Adaptive Streaming over HTTP (DASH) functionality is enabled at the client device 200 and the server 300. If not, the client device transmits a request for the next segment to the server at step 520 and returns to step 512 to process the next segment. In this case, the client device or server cannot adaptively alter the version of the multimedia content being provided to the client device.

If adaptive delivery is enabled at step 516, the client device determines whether it has a specified power status at step 518. This could include, for example, the client device 200 determining whether it is operating in a power-saving mode or whether its power supply level has dropped below a specified threshold. If not, the client device transmits a request for the next segment to the server at step 520 and returns to step 512 to process the next segment. The requested segment here could have the same complexity or power-consumption level as the prior segment, or it could have a higher or lower complexity or power-consumption level than the prior segment. The complexity or power-consumption level of the next segment could depend on various factors, such as the current network conditions.

If the client device has a specified power status at step 518, the client device transmits a request for a segment from a lower-power (less-complex) version of the multimedia content at step 522. This could include, for example, the client device transmitting a request for a segment from a specific version 416a-416m known to have a lower complexity or power consumption value. This could also include the client device transmitting a request for a segment having a lower complexity or power consumption value, where the server 300 then selects the appropriate segment from a lower complexity or lower power version.

In this way, whenever the client device 200 needs to request a segment, the client device 200 checks its power status. If the client device has a certain power status, the client device can select the next segment from a Representation with lower power consumption. Otherwise, the client device can select the next segment from any available representation.

Although FIG. 5 illustrates one example of a method 500 for complexity adaptive streaming, various changes may be made to FIG. 5. For example, while shown as a series of steps, various steps in FIG. 5 could overlap, occur in parallel, occur in a different order, or occur any number of times.

Figure 6:
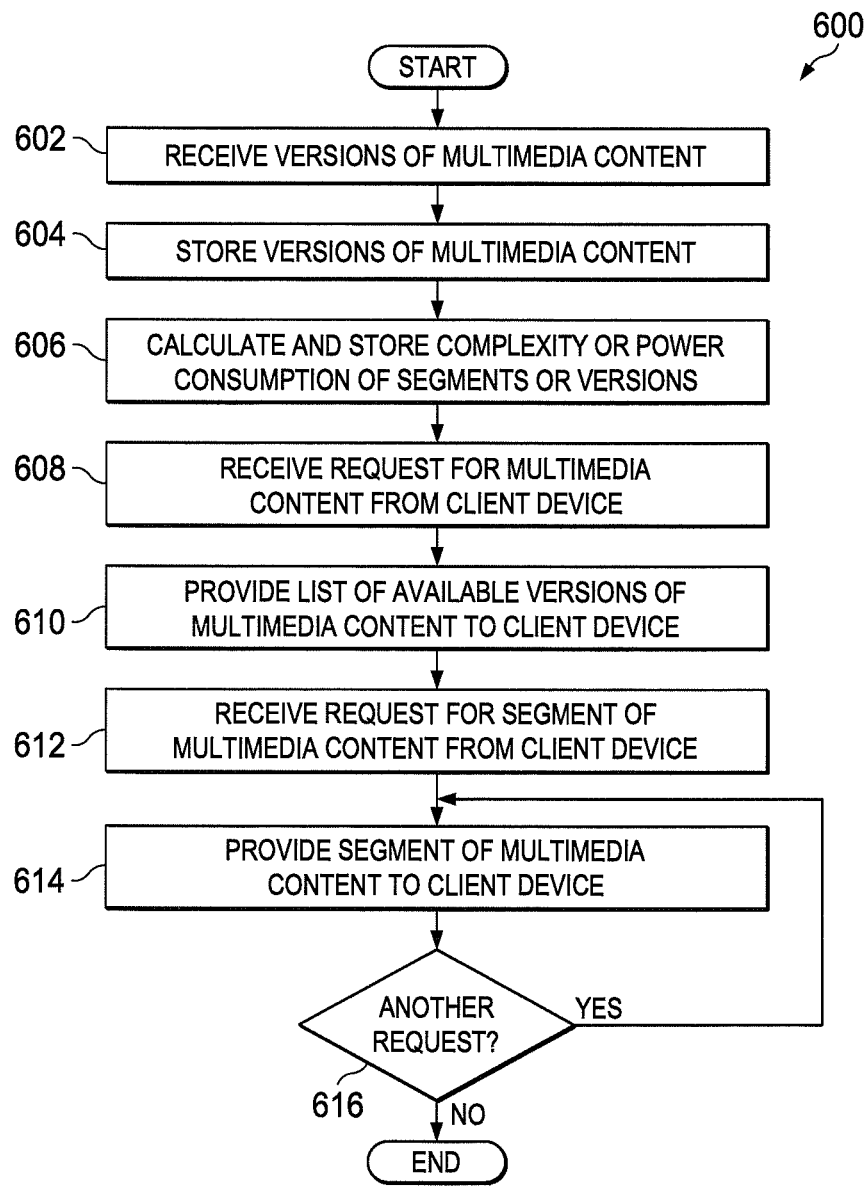
FIG. 6 illustrates an example method for adaptively serving content based on calculated complexity or power consumption according to this disclosure.

FIG. 6 illustrates an example method 600 for adaptively serving content based on calculated complexity or power consumption according to this disclosure. For ease of explanation, the method 600 is described with respect to the server 300 operating in conjunction with the client device 200 in the system 100. However, the method 600 could be used with any other suitable device(s) and in any other suitable system.

The server receives multiple versions of multimedia content at step 602 and stores the multimedia content at step 604. This could include, for example, the server 300 receiving the multimedia content from any suitable source(s) and storing the multimedia content in any suitable database(s) or other storage device(s).

A complexity or power consumption value for each multimedia segment or version is calculated at step 606. This could include, for example, the server 300 calculating complexity values $C_{total}$ as shown in Equation (1) above for the segments 418. The complexity values serve as an indication of the amount of power needed to decode the segments 418. The complexity values can be stored in association with the segments or separately.

A request for multimedia content is received from a client device at step 608. In response, the server provides a list of available versions of the requested multimedia content to the client device at step 610. A request for a multimedia segment in one of the versions is received from the client device at step 612, and the server provides the segment to the client device at step 614. If an additional segment request is received at step 616, the server can return to step 614 to provide the additional segment.

Note that in FIG. 6, it is assumed the client device 200 identifies its power status and requests lower-complexity or lower-power segments. In this case, the server 300 responds to the client device's requests and provides requested segments. In other embodiments, the server 300 could perform other operations to select the lower-complexity or lower-power segments. For instance, the client device 200 could request a lower-complexity segment without identifying the multimedia version, or the client device 200 could provide an indication of its power status to the server 300. The server 300 could then select an appropriate lower-complexity or lower-power segment based on this information.

Although FIG. 6 illustrates one example of a method 600 for adaptively serving content based on calculated complexity or power consumption, various changes may be made to FIG. 6. For example, while shown as a series of steps, various steps in FIG. 6 could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "communicate" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   calculating a complexity value for each segment or version of multimedia content, the multimedia content having multiple versions associated with common content and different encoding parameters, each version divided into segments; and
   adaptively streaming the multimedia content to a client device based on at least some of the calculated complexity values, wherein adaptively streaming the multimedia content comprises:

streaming a first version of the multimedia content to the client device; and
switching to streaming a second version of the multimedia content to the client device based on a power status of the client device;
wherein the complexity value for each segment or version is calculated by summing multiple operation complexity values defining complexities of operations for decoding the segment or version.

2. The method of claim 1, wherein:
the versions of the multimedia content include different versions associated with different encoding standards; and
the operations for decoding vary between at least some of the encoding standards.

3. The method of claim 2, wherein the different versions of the multimedia content have different bitrates and require different computational powers to decode.

4. The method of claim 1, wherein:
all versions are associated with bit parsing, buffer initialization, inverse quantization and transform, and reference block fetch operations;
a first subset of versions are also associated with intra-prediction, fractional interpolation, and in-loop deblocking operations;
a second subset of versions are also associated with intra-prediction, fractional interpolation, in-loop deblocking, and sample adaptive offset correction operations; and
a third subset of versions are also associated with intra-prediction, fractional interpolation, in-loop deblocking, sample adaptive offset correction, adaptive loop filtering, and de-ringing filtering operations.

5. The method of claim 4, wherein the complexity value for each segment or version is calculated as:

$$C_{total}=C_{bit\_parsing}+C_{buf\_init}+C_{intra}+C_{itrans}+C_{ref\_fetch}+C_{intp}+C_{dblk}+C_{sao}+C_{alf}+C_{drf} \quad (1)$$

where:
$C_{total}$ represents the complexity value for the segment or version;
$C_{bit\_parsing}$ represents the operation complexity value of the bit parsing operation;
$C_{buf\_init}$ represents the operation complexity value of the buffer initialization operation;
$C_{intra}$ represents the operation complexity value of the intra-prediction operation;
$C_{itrans}$ represents the operation complexity value of the inverse quantization and transform operation;
$C_{ref\_fetch}$ represents the operation complexity value of the reference block fetch operation;
$C_{intp}$ represents the operation complexity value of the fractional interpolation operation;
$C_{dblk}$ represents the operation complexity value of the in-loop deblocking operation;
$C_{sao}$ represents the operation complexity value of the sample adaptive offset correction operation;
$C_{alf}$ represents the operation complexity value of the adaptive loop filtering operation; and
$C_{drf}$ represents the operation complexity value of the de-ringing filtering operation.

6. The method of claim 5, wherein the operation complexity values are calculated as:

$$C_{bit\_parsing}=k_{bit} \times n_{bit}$$

$$C_{buf\_init}=k_{buf\_init} \times n_{total}$$

$$C_{intra}=k_{intra} \times n_{intra}$$

$$C_{itrans}=k_{itrans} \times (n_{total}-n_{zero})$$

$$C_{ref\_fetch}=k_{ref\_fetch} \times n_{total}$$

$$C_{intp}=k_{intp} \times n_{intp}$$

$$C_{dblk}=k_{dblk} \times n_{dblk}$$

$$C_{sao}=k_{sao} \times n_{sao}$$

$$C_{alf}=k_{alf} \times n_{alf}$$

$$C_{drf}=k_{drf} \times n_{drf}$$

where:
$n_{bit}$ represents a number of bits;
$n_{total}$ represents a number of blocks;
$n_{intra}$ represents an intra-block number;
$n_{zero}$ represents a number of zero blocks
$n_{intp}$ represents a number of interpolations;
$n_{dblk}$ represents a number of pixels requiring deblocking;
$n_{sao}$ represents a number of pixels requiring sample adaptive offset correction;
$n_{alf}$ represents a number of blocks requiring adaptive loop filtering;
$n_{drf}$ represents a number of blocks requiring de-ringing filtering; and
$k_{bit}$, $k_{buf\_init}$, $k_{intra}$, $k_{itrans}$, $k_{ref\_fetch}$, $k_{intp}$, $k_{dblk}$, $k_{sao}$, $k_{alf}$, and $k_{drf}$ denote unit operation complexity values.

7. The method of claim 1, wherein:
streaming the first version comprises streaming the first version in response to a first request from the client device; and
switching to streaming the second version comprises selecting the second version in response to a second request from the client device.

8. The method of claim 1, further comprising:
providing a list of the different versions of the multimedia content to the client device.

9. An apparatus comprising:
at least one network interface configured to communicate with a client device over a network; and
at least one processing device configured to:
calculate a complexity value for each segment or version of multimedia content, the multimedia content having multiple versions associated with common content and different encoding parameters, each version divided into segments; and
adaptively stream the multimedia content via the at least one network interface to the client device based on at least some of the calculated complexity values, wherein the at least one processing device is configured to adaptively stream the multimedia content by:
streaming a first version of the multimedia content to the client device; and
switching to streaming a second version of the multimedia content to the client device based on a power status of the client device;
wherein the at least one processing device is configured to calculate the complexity value for each segment or version by summing multiple operation complexity values defining complexities of operations for decoding the segment or version.

10. The apparatus of claim 9, wherein:
the versions of the multimedia content include different versions associated with different encoding standards; and the operations for decoding vary between at least some of the encoding standards.

11. The apparatus of claim 9, wherein:
all versions are associated with bit parsing, buffer initialization, inverse quantization and transform, and reference block fetch operations;
a first subset of versions are also associated with intra-prediction, fractional interpolation, and in-loop deblocking operations;
a second subset of versions are also associated with intra-prediction, fractional interpolation, in-loop deblocking, and sample adaptive offset correction operations; and
a third subset of versions are also associated with intra-prediction, fractional interpolation, in-loop deblocking, sample adaptive offset correction, adaptive loop filtering, and de-ringing filtering operations.

12. The apparatus of claim 11, wherein the at least one processing device is configured to calculate the complexity value for each segment or version as:

$$C_{total} = C_{bit\_parsing} + C_{buf\_init} + C_{intra} + C_{itrans} + C_{ref\_fetch} + C_{intp} + C_{dblk} + C_{sao} + C_{alf} + C_{drf}$$

where:
$C_{total}$ represents the complexity value for the segment or version;
$C_{bit\_parsing}$ represents the operation complexity value of the bit parsing operation;
$C_{buf\_init}$ represents the operation complexity value of the buffer initialization operation;
$C_{intra}$ represents the operation complexity value of the intra-prediction operation;
$C_{itrans}$ represents the operation complexity value of the inverse quantization and transform operation;
$C_{ref\_fetch}$ represents the operation complexity value of the reference block fetch operation;
$C_{intp}$ represents the operation complexity value of the fractional interpolation operation;
$C_{dblk}$ represents the operation complexity value of the in-loop deblocking operation;
$C_{sao}$ represents the operation complexity value of the sample adaptive offset correction operation;
$C_{alf}$ represents the operation complexity value of the adaptive loop filtering operation; and
$C_{drf}$ represents the operation complexity value of the de-ringing filtering operation.

13. The apparatus of claim 12, wherein the at least one processing device is configured to calculate the operation complexity values as:

$$C_{bit\_parsing} = k_{bit} \times n_{bit}$$

$$C_{buf\_init} = k_{buf\_init} \times n_{total}$$

$$C_{intra} = k_{intra} \times n_{intra}$$

$$C_{itrans} = k_{itrans} \times (n_{total} - n_{zero})$$

$$C_{ref\_fetch} = k_{ref\_fetch} \times n_{total}$$

$$C_{intp} = k_{intp} \times n_{intp}$$

$$C_{dblk} = k_{dblk} \times n_{dblk}$$

$$C_{sao} = k_{sao} \times n_{sao}$$

$$C_{alf} = k_{alf} \times n_{alf}$$

$$C_{drf} = k_{drf} \times n_{drf}$$

where:
$n_{bit}$ represents a number of bits;
$n_{total}$ represents a number of blocks;
$n_{intra}$ represents an intra-block number;
$n_{zero}$ represents a number of zero blocks;
$n_{intp}$ represents a number of interpolations;
$n_{dblk}$ represents a number of pixels requiring deblocking;
$n_{sao}$ represents a number of pixels requiring sample adaptive offset correction;
$n_{alf}$ represents a number of blocks requiring adaptive loop filtering;
$n_{drf}$ represents a number of blocks requiring de-ringing filtering; and
$k_{bit}$, $k_{buf\_init}$, $k_{intra}$, $k_{itrans}$, $k_{ref\_fetch}$, $k_{intp}$, $k_{dblk}$, $k_{sao}$, $k_{alf}$, and $k_{drf}$ denote unit operation complexity values.

14. The apparatus of claim 9, wherein the at least one processing device is further configured to provide a list of the different versions of the multimedia content to the client device.

15. A method comprising:
receiving a list of available versions of multimedia content at a client device, the multimedia content having multiple versions associated with common content and different encoding parameters, each version divided into segments;
identifying whether the client device has a specified power status;
when the client device has the specified power status, selecting or switching to a segment or version that consumes less power for decoding; and
receiving and rendering the segment or version of multimedia content;
wherein the selecting or switching comprises selecting or switching to a segment or version having a lower complexity value, the complexity value comprising a sum of multiple operation complexity values defining complexities of operations for decoding the segment or version.

16. The method of claim 15, wherein the selecting or switching occurs without discontinuing use of a streaming service.

17. The method of claim 15, wherein the complexity value for each segment or version is defined as:

$$C_{total} = C_{bit\_parsing} + C_{buf\_init} + C_{intra} + C_{itrans} + C_{ref\_fetch} + C_{intp} + C_{dblk} + C_{sao} + C_{alf} + C_{drf}$$

where:
$C_{total}$ represents the complexity value for the segment or version;
$C_{bit\_parsing}$ represents the operation complexity value of a bit parsing operation;
$C_{buf\_init}$ represents the operation complexity value of a buffer initialization operation;
$C_{intra}$ represents the operation complexity value of an intra-prediction operation;
$C_{itrans}$ represents the operation complexity value of an inverse quantization and transform operation;
$C_{ref\_fetch}$ represents the operation complexity value of a reference block fetch operation;
$C_{intp}$ represents the operation complexity value of a fractional interpolation operation;
$C_{dblk}$ represents the operation complexity value of an in-loop deblocking operation;
$C_{sao}$ represents the operation complexity value of a sample adaptive offset correction operation;
$C_{alf}$ represents the operation complexity value of an adaptive loop filtering operation; and $C_{drf}$ represents the operation complexity value of a de-ringing filtering operation.

18. The method of claim 17, wherein the operation complexity values are defined as:

$$C_{bit\_parsing} = k_{bit} \times n_{bit}$$

$$C_{buf\_init} = k_{buf\_init} \times n_{total}$$

$$C_{intra} = k_{intra} \times n_{intra}$$

$$C_{itrans} = k_{itrans} \times (n_{total} - n_{zero})$$

$$C_{ref\_fetch} = k_{ref\_fetch} \times n_{total}$$

$$C_{intp} = k_{intp} \times n_{intp}$$

$$C_{dblk} = k_{dblk} \times n_{dblk}$$

$$C_{sao} = k_{sao} \times n_{sao}$$

$$C_{alf} = k_{alf} \times n_{alf}$$

$$C_{drf} = k_{drf} \times n_{drf}$$

where:
- $n_{bit}$ represents a number of bits;
- $n_{total}$ represents a number of blocks;
- $n_{intra}$ represents an intra-block number;
- $n_{zero}$ represents a number of zero blocks
- $n_{intp}$ represents a number of interpolations;
- $n_{dblk}$ represents a number of pixels requiring deblocking;
- $n_{sao}$ represents a number of pixels requiring sample adaptive offset correction;
- $n_{alf}$ represents a number of blocks requiring adaptive loop filtering;
- $n_{drf}$ represents a number of blocks requiring de-ringing filtering; and
- $k_{bit}$, $k_{buf\_init}$, $k_{intra}$, $k_{itrans}$, $k_{ref\_fetch}$, $k_{intp}$, $k_{dblk}$, $k_{sao}$, $k_{alf}$ and $k_{drf}$ denote unit operation complexity values.

* * * * *